(12) United States Patent
Montevirgen et al.

(10) Patent No.: US 11,119,321 B2
(45) Date of Patent: Sep. 14, 2021

(54) ELECTRONIC DEVICE WITH A DISPLAY ATTACHED TO A LENS ELEMENT

(71) Applicant: Apple Inc., Cupertino, CA (US)

(72) Inventors: Anthony S. Montevirgen, Milpitas, CA (US); Ivan S. Maric, Cupertino, CA (US); Jan K. Quijalvo, Mississauga (CA); John N. Border, Campbell, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 16/388,538

(22) Filed: Apr. 18, 2019

(65) Prior Publication Data

US 2020/0081253 A1 Mar. 12, 2020

Related U.S. Application Data

(60) Provisional application No. 62/740,334, filed on Oct. 2, 2018, provisional application No. 62/729,365, filed on Sep. 10, 2018.

(51) Int. Cl.
*G02B 27/01* (2006.01)
*H04N 13/344* (2018.01)
*G02B 7/02* (2021.01)

(52) U.S. Cl.
CPC ......... *G02B 27/0172* (2013.01); *G02B 7/021* (2013.01); *H04N 13/344* (2018.05)

(58) Field of Classification Search
CPC .......... G02B 2027/0178; G02B 27/017; G02B 2027/0123; G02B 27/0179; G02B 2027/0132; G02B 17/0856; G02B 2027/0125; G02B 2027/015; G02B 27/0093; G02B 27/1066; G02B 27/143; G02B 7/021; G02B 13/0045; G02B 27/0006; G02B 27/0149; G02B 6/003;
(Continued)

(56) References Cited

U.S. PATENT DOCUMENTS 6,388,813 B1   5/2002  Wilson et al.
6,529,331 B2   3/2003  Massof et al.
(Continued)

FOREIGN PATENT DOCUMENTS

CN   104793452 A   7/2015
CN   104914579 A   9/2015
(Continued)

*Primary Examiner* — Duc Q Dinh
(74) *Attorney, Agent, or Firm* — Treyz Law Group, P.C.; Joseph F. Guihan

(57) ABSTRACT

A head-mounted device may have a display that displays content for a user. Head-mounted support structures in the device support the display on the head of the user. The head-mounted device may have a left lens that directs images from the left portion of the display to a left eye box and a right lens that directs images from the right portion of the display to a right eye box. Each lens may include a lens element that is coupled to the display. The lens element may be attached to the display with a layer of optically clear adhesive or the lens element may be formed from gel that directly contacts the display. The lens element attached to the display may have protrusions or recesses to accommodate input-output components. A single lens element may be attached to both the left and right portions of the display.

7 Claims, 10 Drawing Sheets

(58) Field of Classification Search
CPC . G02B 7/02; G02B 7/04; G02B 15/14; G02B 2006/12102; G02B 2027/0107; G02B 25/001; G02B 1/11; G02B 2027/0138; G02B 27/0172; G09G 5/00; G09G 5/006; G09G 2380/02; G06F 1/163; G06F 1/3265; G06F 3/013; G06F 1/1652; G06F 3/011; G06F 1/1605; G06F 1/1607; G06F 1/1639; G06F 1/1641; G06F 1/1675; G06F 1/1677; G06F 1/1681; G06F 1/1684; G06F 1/1686; G06F 1/182; G06F 1/206; G06F 21/6245; G06F 3/012; G06F 3/0362; H01L 24/97; H01L 25/0753; H01L 27/14623; H01L 27/14629; H01L 2924/1815; H01L 31/0203; H01L 31/02325; H01L 31/02327; H04N 13/344
USPC .......................................................... 345/7–9
See application file for complete search history.

(56) References Cited

U.S. PATENT DOCUMENTS

| | | | |
|---|---|---|---|
| 9,841,598 B2 * | 12/2017 | Ouderkirk | G02B 27/142 |
| 9,939,648 B2 * | 4/2018 | Lee | G02B 27/0172 |
| 2004/0212776 A1 | 10/2004 | Spitzer et al. | |
| 2006/0007367 A1 * | 1/2006 | Cho | G02F 1/133308 |
| | | | 349/58 |
| 2009/0189548 A1 * | 7/2009 | Hoffman | H05B 45/10 |
| | | | 315/307 |
| 2010/0290127 A1 | 11/2010 | Kessler et al. | |
| 2011/0249230 A1 * | 10/2011 | Blum | G02C 9/00 |
| | | | 351/47 |
| 2014/0153102 A1 | 6/2014 | Chang | |
| 2015/0138224 A1 | 5/2015 | Kim et al. | |
| 2015/0153825 A1 * | 6/2015 | Lee | G06F 21/31 |
| | | | 345/8 |
| 2016/0131909 A1 * | 5/2016 | Nakamura | G02B 6/0041 |
| | | | 345/8 |
| 2017/0099478 A1 * | 4/2017 | Cambridge | G06F 3/005 |
| 2017/0262703 A1 * | 9/2017 | Wilson | G02B 27/017 |
| 2018/0239133 A1 * | 8/2018 | Seder | G02B 27/0149 |
| 2018/0246327 A1 | 8/2018 | Takagi et al. | |
| 2018/0275417 A1 * | 9/2018 | Kwon | G02B 3/0062 |
| 2019/0137766 A1 | 5/2019 | Jang et al. | |
| 2019/0212489 A1 * | 7/2019 | Xu | G02B 6/0088 |

FOREIGN PATENT DOCUMENTS

| | | | | |
|---|---|---|---|---|
| CN | 206348525 U | 7/2017 | | |
| CN | 107479193 A | 12/2017 | | |
| CN | 108469675 A | 8/2018 | | |
| JP | H08278476 A | * 10/1996 | ............... | G02F 1/13 |
| JP | H08278476 A | 10/1996 | | |
| JP | 2018097294 A | 6/2018 | | |
| KR | 20180029177 A | 3/2018 | | |

* cited by examiner

ELECTRONIC DEVICE WITH A DISPLAY ATTACHED TO A LENS ELEMENT

This application claims the benefit of provisional patent application No. 62/729,365, filed Sep. 10, 2018, and provisional patent application No. 62/740,334, filed Oct. 2, 2018, which are hereby incorporated by, reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

It may be difficult to precisely align lenses with displays. If care is not taken, a lens may be poorly aligned with a corresponding display and the visual content may not be displayed properly.

SUMMARY

A head-mounted device may have a display that displays content for a user. Head-mounted support structures in the device support the display on the head of the user.

The head-mounted device may have respective left and right lenses and respective left and right portions of a display. The left lens may direct images from the left portion of the display to a left eye box whereas the right lens may direct images from the right portion of the display to a right eye box.

To prevent dust from blocking portions of the display, each lens may include a lens element that has a surface that faces the display and is coupled to the display. The lens element may be attached to the display with a layer of optically clear adhesive or the lens element may be a gel lens element that directly contacts the display. Attaching the lens directly to the display removes any air gap from in front of the display, which may prevent dust or other contaminants from obfuscating the display.

The lens element attached to the display may have protrusions or recesses to accommodate input-output components in the head-mounted device. The lens element may be supported by a lens module support structure. The lens module support structure may have an opening that allows an input-output component such as a camera for gaze detection to operate through the lens element.

A single lens element may be attached to both the left portion of the display and the right portion of the display. This fixes interpupillary distance but may improve alignment of the displays and reduce manufacturing costs and complexity.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

In some head-mounted devices, an air gap may be present between a display and a lens module associated with that display. In these instances, dust or other contaminants may enter the air gap and cause visual artifacts when viewing content from the display. Instead of an air gap between a display and a lens module in a head-mounted device, a lens element in the lens module may occupy the space of the air gap. In other words, the lens module may be attached directly to the display such that there is no air gap present between the lens module and the display.

There may be many advantages to attaching a lens element of the lens module directly to the display. The presence of the lens element may prevent dust or other contaminants from entering the space in front of the display (preventing the presence of visible artifacts when viewing the display). Aligning the lens module with the display may also be easier when the display is attached directly to the lens module. Mechanical stresses on the display may also be improved with this arrangement. By attaching the display to the lens module, adhesive (such as optically clear adhesive or an optical gel) may be placed across the entire display (instead of just around the periphery of the display), evenly distributing the mechanical stress across the display. An additional lens element that is attached to the display may also provide a location to mount additional components of the head-mounted device such as input-output components.

Figure 1:
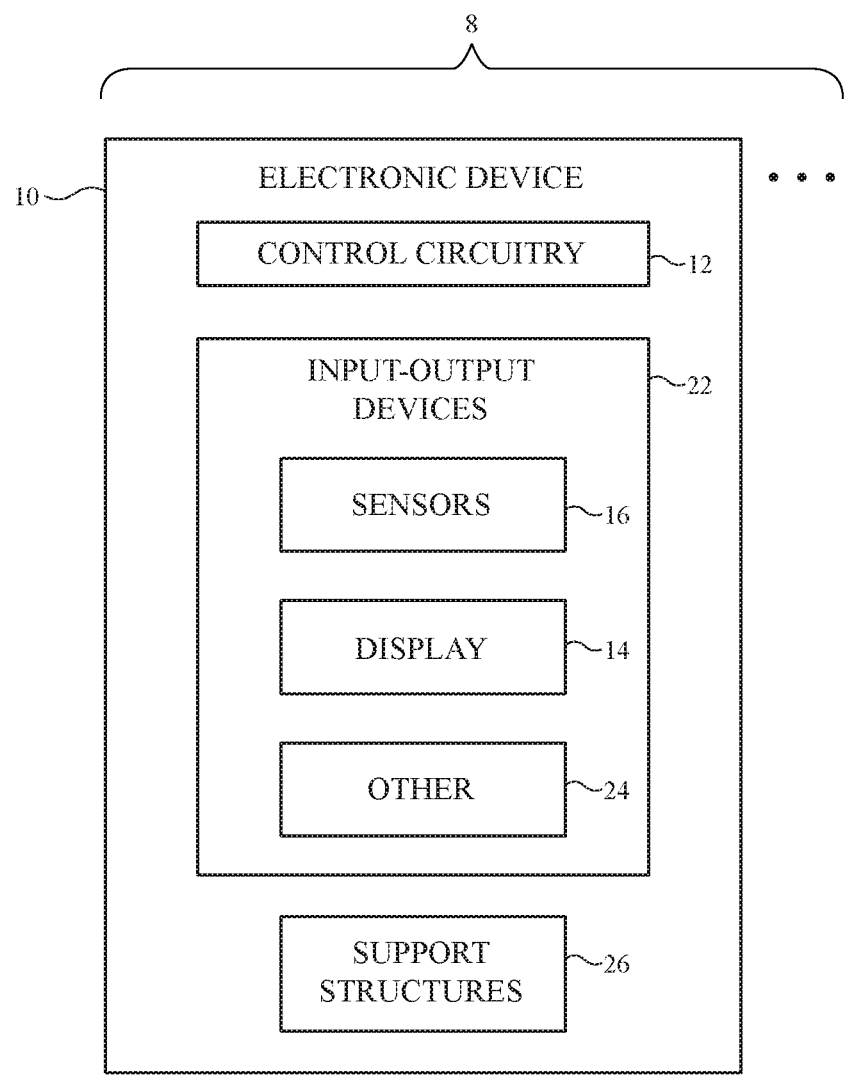
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present display content for a computer-generated reality such as virtual reality content or mixed reality content.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Configurations in which display 14 is used to display virtual reality content to a user through lenses are described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
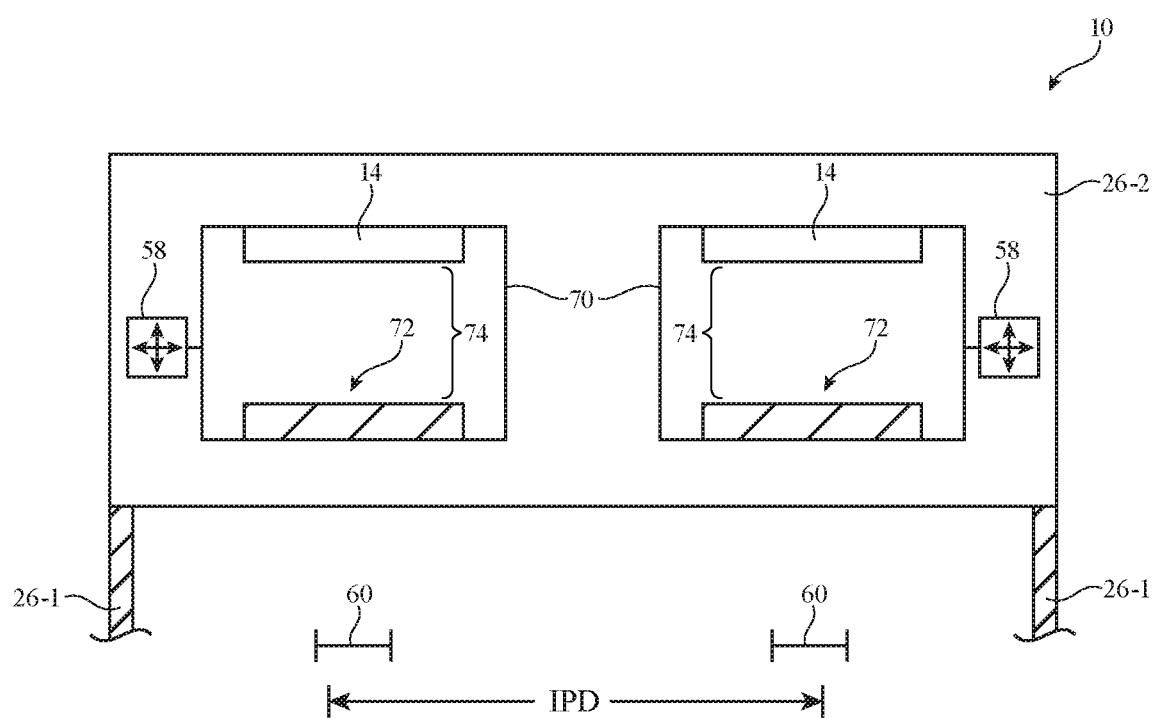
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face so that the user's eyes are located within eye boxes 60.

Display 14 may include left and right display panels (e.g., left and right pixel arrays, sometimes referred to as left and right displays or left and right display portions) that are mounted respectively in left and right display modules 70 corresponding respectively to a user's left eye (and left eye box 60) and right eye (and right eye box).

Each display module 70 includes a display portion 14 and a corresponding lens module 72 (sometimes referred to as lens stack-up 72 or lenses 72). Lenses 72 may include a plurality of lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired transparent material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as respective left and right positioners 58. Positioners 58 may be stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes.

In FIG. 2, each display 14 is separated from its corresponding lens module 72 by an air gap 74. In other words, an air-filled volume within support structures 26-2 is interposed between lens 72 and display 14. If dust or other contaminants enter the air gap 74 between display 14 and lens 72, the dust may be visible to the viewer. Therefore, the air gap 74 may instead be filled with a lens element of lens 72.

Figure 3:
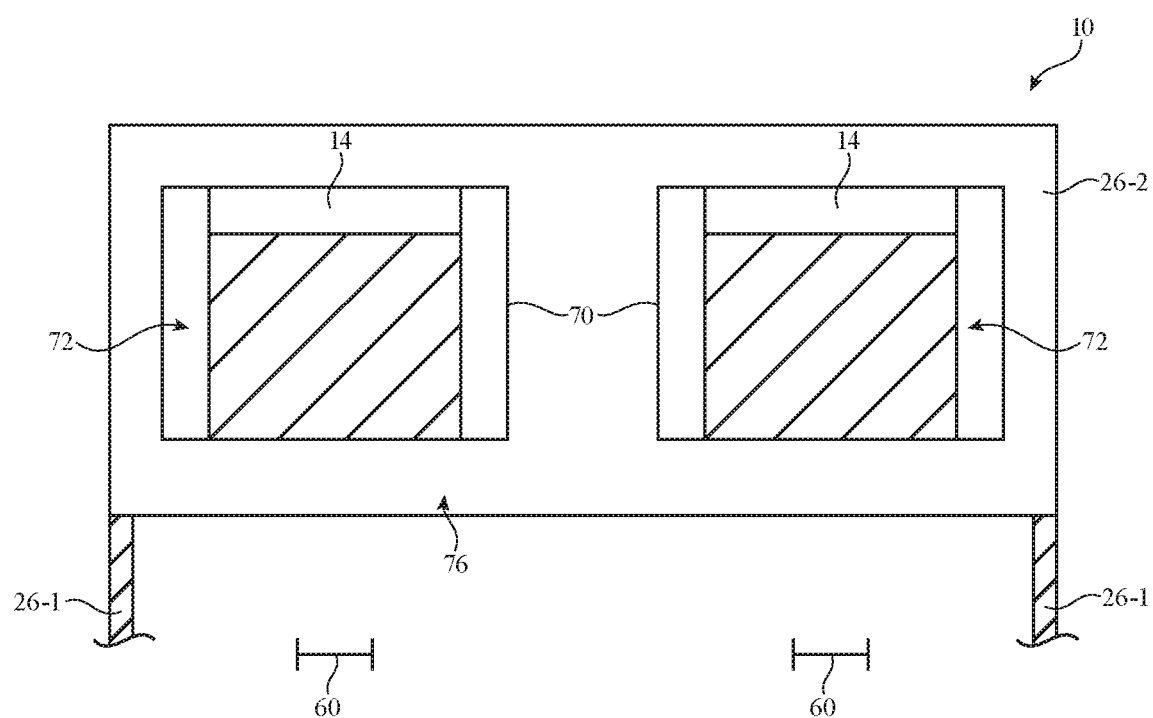
FIG. 3 is a top view of an illustrative head-mounted device showing how a display may be attached to a corresponding lens module in accordance with an embodiment.

FIG. 3 is a top view of a head-mounted device 10 with a display attached directly to a lens module. As shown, instead of an air gap between lens 72 and display 14 as in FIG. 2, lens 72 fills the air gap and is attached directly to display 14. The lens may extend from a portion 76 (sometimes referred to as a housing wall, housing portion, support structure, support structure portion, etc.) of support structures 26-2 to display 14. In this way, the lens is directly adjacent to and abuts display 14. By removing any air gap between lens 72 and display 14, dust is prevented from entering the space between lens 72 and display 14.

Display 14 may be attached directly to lens 72. For example, an adhesive layer such as an optically clear adhesive (OCA) may be interposed between display 14 and lens 72 to attach display 14 to lens 72. Attaching display 14 to lens 72 in this way may improve alignment between the display and the lens module.

Head-mounted device 10 in FIG. 3 may also include positioners that can adjust the spacing between modules 70 to match the interpupillary distance of a user's eyes (as discussed in connection with FIG. 2).

Figure 4:
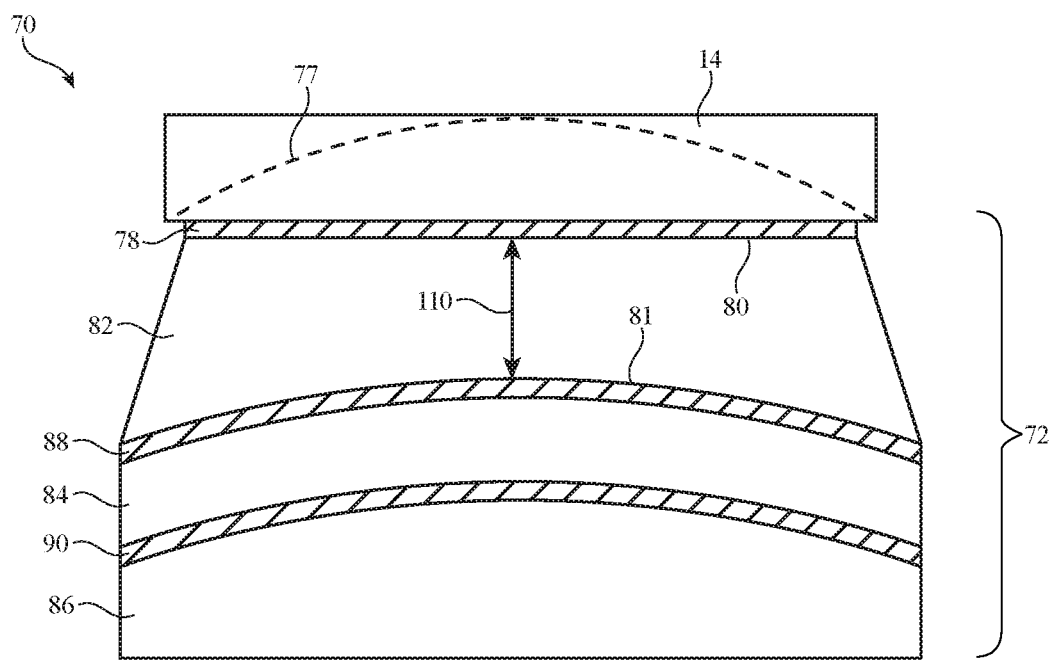
FIG. 4 is a top view of an illustrative display module with a display attached to a lens element of a lens module that includes three lens elements in accordance with an embodiment.

FIG. 4 is a cross-sectional side view of an illustrative display module 70 with a lens element attached to display 14. As shown in FIG. 4 lens module 72 may include lens elements 82, 84, and 86. Lens element 82 may be attached to display 14 using optically clear adhesive layer 78. Lens element 82 may have first and second opposing surfaces 80 and 81. Surface 80 is attached to display 14 using the optically clear adhesive. Surface 80 may therefore be planar (because display 14 is planar). Display 14 may optionally be curved (e.g., display 14 may have a light-emitting surface with a profile shown by dashed line 77). If display 14 is curved, surface 80 of lens element 82 may conform to the curvature of display 14. Surface 80 attached may therefore be planar, concave, convex, or another shape depending upon the shape of display 14. Surface 81 of lens element 82 may be planar, concave, convex, or another shape.

Additional lens elements 84 and 86 may be attached to lens element 82. Lens element 84 may be attached to surface 81 of lens element 82. Both lens elements 84 and 86 may be any desired type of lens (e.g., biconvex, plano-convex, positive meniscus, negative meniscus, plano-concave, biconcave, etc.).

Coatings such as coatings 88 and 90 may be interposed between the lens elements. Each coating may include one or more coatings or films including an adhesive coating (e.g., an optically clear adhesive layer), a partially reflective mirror, a reflective polarizer, a quarter wave plate, a wave plate, a linear polarizer, and an antireflection coating.

There are numerous possible arrangements for the lens elements of lens module 72. In general, the design of lens module 72 (including the number of lens elements, shape and materials of the lens elements, coatings between the lens elements, dimensions of the lens elements, etc.) may vary based on numerous design factors that depend on the specifics of the given system. Lens module 72 may include, for example, any desired number of lens elements. FIG. 4 depicts lens module 72 as having three lens elements (e.g., the lens element attached to the display and two additional lens elements). This example is merely illustrative. Lens module 72 may have one lens element (e.g., only the lens element attached to the display), two lens elements, three lens elements, four lens elements, five lens elements more than five elements, less than ten elements, between two and five lens elements, etc. The shape and material of each of the lens elements may be selected to manipulate light from display 14 in a desired manner.

Lens element 82 may have a different refractive index than adjacent lens element 84. Alternatively, lens element 82 may have the same refractive index as adjacent lens element 84. Because coating 88 separates lens elements 82 and 84, lens element 82 may be considered a separate lens element than lens element 84 even if lens elements 82 and 84 are formed from material having the same refractive index. However, in a preferred embodiment, lens element 82 has a refractive index that is lower than lens element 84 so that surface 81 provides optical power through refraction.

The distance between lens element 82 and display 14 (e.g., the surface 80 of lens element 82 and display 14) is, in FIG. 4, defined by the thickness of optically clear adhesive layer 78. The distance between lens element 82 and display 14 may be less than 2 millimeters, less than 1 millimeter, less than 500 microns, less than 250 microns, less than 100 microns, less than 50 microns, less than 30 microns, less than 15 microns, less than 10 microns, less than 5 microns, less than 1 micron, less than 0.1 micron, less than 0.01 micron, greater than 1 micron, between 1 micron and 100 microns, greater than 10 microns, greater than 100 microns, etc. The thickness of the lens element 82 attached to the display may vary across the lens element or may be uniform. The thickness of the lens element 82 at its thinnest point (e.g., thickness 110 in FIG. 4) may be greater than 20 millimeters, greater than 10 millimeters, greater than 6 millimeters, greater than 4 millimeters, greater than 2 millimeters, greater than 1 millimeter, greater than 500 microns, greater than 250 microns, greater than 100 microns, greater than 50 microns, greater than 30 microns, greater than 15 microns, greater than 10 microns, greater than 5 microns, less than 3 millimeters, less than 2 millimeters, less than 1 millimeter, etc. One or more of the lens elements of lens module 72 may optionally be adjustable (e.g., may have an adjustable shape, refractive index, etc.).

In FIG. 4, each lens element is a rigid lens element (e.g., formed from glass or a rigid polymer material). Lens element 82 is a rigid lens element that is attached to the light-emitting surface of display 14. In this way, lens element 82 fills the gap between display 14 and lens element 84. Lens element 82 may therefore sometimes be referred to as a gap-filling lens element. As such, the lens element 82 may be made from a rigid material so that the lens element 82 fills the gap between the display 14 and the lens element 84. Alternatively, the lens element 82 may be made from liquid casting materials that are cast in place to fill the gap between the lens element 82 and the display 14. In addition, one or more lens elements in lens 72 may be non-rigid lens elements. For example, gap-filling lens element 82 between display 14 and lens element 84 may be formed from a non-rigid clear material such as gel as will be discussed in greater detail in connection with FIG. 10. One possible advantage of using a non-rigid clear material such as a gel is that differential expansion between the lens element 84 and the display 14 due to changes in the environmental conditions can be accommodated by shearing of the gel. Alternatively, the non-rigid clear material of lens element 82 can be a clear elastomeric material such as a silicone (sometimes referred to as an elastomer) that is cast in place and differential expansion can be accommodated by deformation of the elastomeric material.

Previously, it has been discussed how attaching lens element 82 directly to display 14 (to fill the air gap) both prevents dust contamination and improves alignment between the lens module and display. However, there may be additional benefits to this arrangement. For example, in FIG. 2 (when an air gap is present between lens module 72 and display 14), support structure 26-2 must support display 14. By attaching display 14 to the lens module as shown in FIGS. 3 and 4, the requirements of support structure 26-2 to support display 14 are alleviated.

Figure 5:
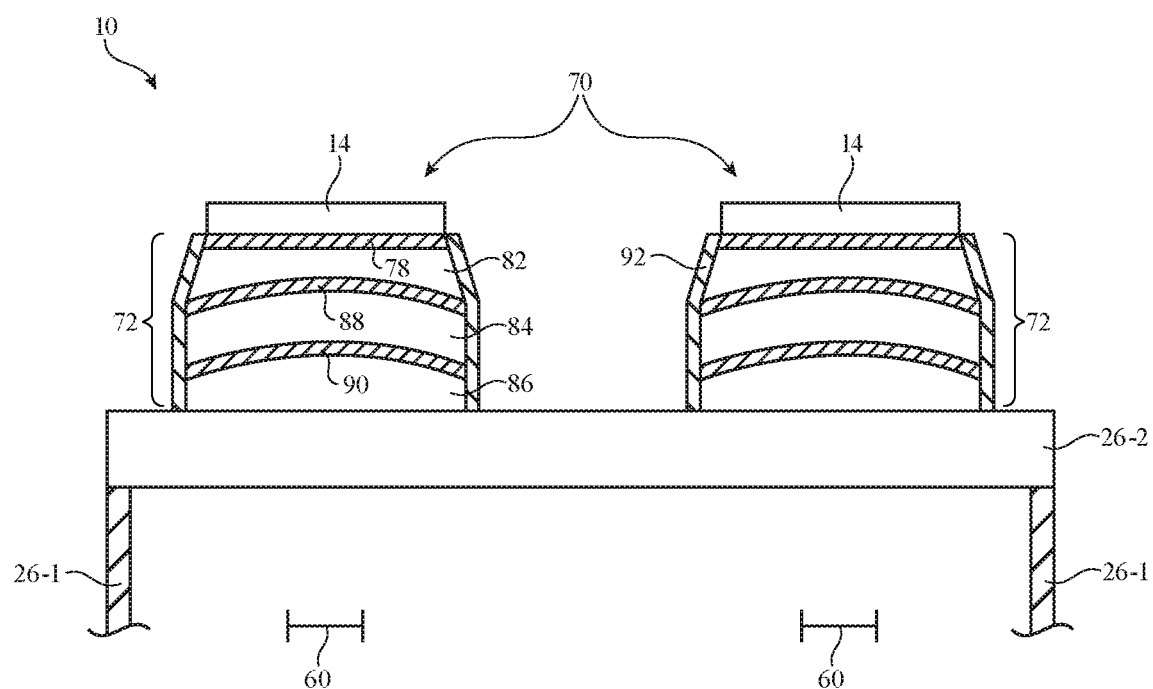
FIG. 5 is a top view of an illustrative head-mounted device including a display attached to a lens module that includes an edge coating in accordance with an embodiment.

FIG. 5 is a top view of a head-mounted device 10 with a display attached directly to a lens module and a support structure with a reduced size. FIG. 5 shows each display module 70 as including a display and lens module of the type shown in FIG. 4. Each lens module 72 includes a first lens element 82 attached to display 14 with a layer of optically clear adhesive 78, a second lens element 84 adjacent to lens element 82 with one or more intervening coatings 88, and a third lens element 86 adjacent to lens element 84 with one or more intervening coatings 90.

Support structure 26-2 in FIG. 5 is smaller than support structure 26-2 in FIG. 2. By mounting display 14 to lens module 72, support structure 26-2 is not required to be directly attached to display 14. As shown, display 14 may be attached to support structure 26-2 through lens module 72, reducing the mechanical requirements placed on support structure 26-2.

FIG. 5 also shows how a coating 92 may be formed on the edge surfaces of the lens elements in lens module 72. Coating 92 may be a light-blocking coating. For example, coating 92 may be a reflective coating, partially reflective coating, a light absorbing coating (e.g., a black ink layer), or any other desired coating. Coating 92 may prevent light from leaking out of the lens module 72.

Figure 6:
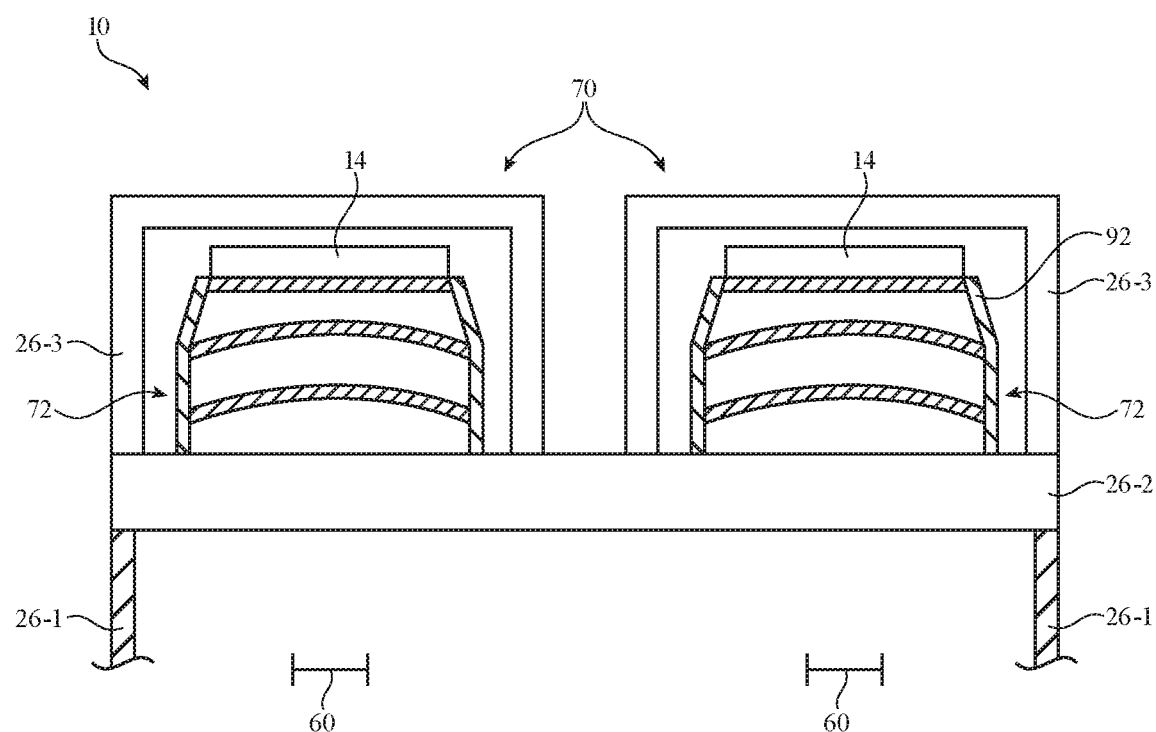
FIG. 6 is a top view of an illustrative head-mounted device including a display attached to a lens module and a support structure around the lens module in accordance with an embodiment.

The example of FIG. 5 in which display modules 70 are mounted to support structure 26-2 without any additional protective components is merely illustrative. If desired an additional protective and/or supporting component may be provided as shown in FIG. 6. In FIG. 6, display 14 is again attached directly to lens module 72. However, an additional structure 26-3 may be included that at least partially surrounds the display modules. For example, additional structure 26-3 may be a protective sheath that prevents lens module 72 and display 14 from being scratched or damaged. Because display 14 is attached to lens module 72 (which is supported by support structure portion 26-2), structure 26-3 does not necessarily need to provide mechanical support for lens module 72 or display 14. This allows structure 26-3 to optionally be thin or otherwise not contribute to physically supporting lens module 72 or display 14. Alternatively, structure 26-3 may still be attached to lens module 72 and/or display 14 and may provide additional structural support for lens module 72 and/or display 14. Structure 26-3 (which may sometimes be referred to as support structure 26-3, support structure portion 26-3, lens support structure 26-3, lens module support structure 26-3) may be attached to lens module 72 or display 14 with adhesive or other desired attachment mechanisms. Structure 26-3 may have a coating on an interior surface of the structure that prevents light leakage. For example, structure 26-3 may have a reflective coating, partially reflective coating, a light absorbing coating (e.g., a black ink layer), or any other desired coating on an interior surface adjacent to the lens module 72.

Figure 7:
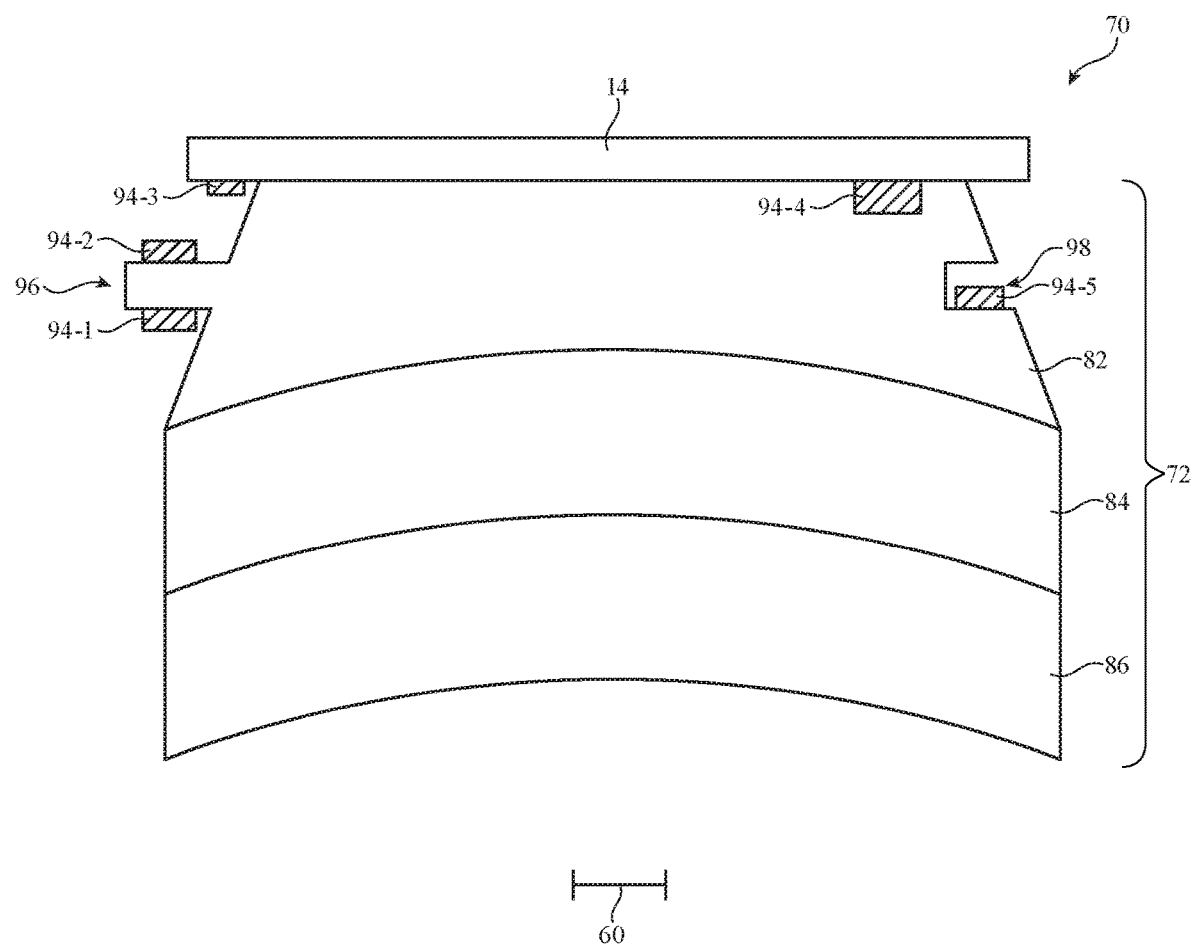
FIG. 7 is a cross-sectional side view of an illustrative display module with a display attached to a lens element and input-output components mounted to the lens element in accordance with an embodiment.

FIG. 7 is a top view of an illustrative display module with a display attached to a lens module and incorporated additional components. As shown in FIG. 7, lens module 72 includes a lens element 82 attached to display 14 as well as lens elements 84 and 86. The optically clear adhesive attaching lens element 82 to display 14 as well as the coatings between the lens elements are not explicitly labeled in FIG. 7.

As shown in FIG. 7, additional input-output components 94 (e.g., components 94-1, 94-2, 94-3, 94-4, and 94-5) may be included in numerous possible locations within display module 70. Each input-output component may be electrically connected to control circuitry 12, if desired. Lens element 82 (that is attached to display 14) may include a protrusion 96 that extends from a side surface of the lens element. Input-output components may be mounted on either side of protrusion 96. For example, input-output component 94-1 is mounted on a first side (e.g., an eye-facing side) of protrusion 96 and input-output component 94-2 is mounted on the second, opposing side (e.g., a front-facing side) of protrusion 96. Input-output component 94-3 is mounted on display 14. Input-output component 94-4 is mounted on display 14 and is covered by lens element 82. In other words, lens element 82 may be molded over component 94-4 or may have a recess to accommodate component 94-4. Input-output component 94-4 may be described as being embedded within lens element 82. Lens element 82 may also have a recess 98. Input-output component 94-5 may be mounted on a surface of lens element 82 within recess 98.

Each input-output component 94 may be any desired type of input-output component. Each input-output component 94 may be a sensor such as a three-dimensional sensor (e.g., a three-dimensional image sensor such as a structured light sensor that emits beams of light and that uses two-dimensional digital image sensors to gather image data for three-dimensional images from light spots that are produced when a target is illuminated by the beams of light, a binocular three-dimensional image sensor that gathers three-dimensional images using two or more cameras in a binocular imaging arrangement, a three-dimensional light detection and ranging sensor, a three-dimensional radio-frequency sensor, or other sensor that gathers three-dimensional image data), a camera (e.g., infrared and/or visible digital image sensor), a gaze tracking sensor (e.g., a gaze tracking system based on an image sensor and, if desired, a light source that emits one or more beams of light that are tracked using the image sensor after reflecting from a user's eyes), a touch sensor, a button, a force sensor, a sensor such as contact sensor based on switches, a gas sensor, a pressure sensor, a moisture sensor, a magnetic sensor, an audio sensor (microphone), an ambient light sensor, a microphones for gathering voice commands and other audio input, a sensors that are configured to gather information on motion, position, and/or orientation (e.g., accelerometer, gyroscope, compass, and/or inertial measurement unit that include all of these sensors or a subset of one or two of these sensors), fingerprint sensor or other biometric sensor, an optical position sensor (optical encoders), another type of position sensor such as a linear position sensor, or a proximity sensor (e.g., capacitive proximity sensor, light-based proximity sensor, ultrasonic proximity sensor, and/or other proximity sensors). Each input-output component 94 may be a haptic output device (e.g., a vibrating component), a light-emitting diode or other light source, a speaker such as an ear speaker for producing audio output, or another electrical component. Input-output components 94 may include sensors of the same type or sensors of different types. The example of input-output components mounted in recesses of lens element 82 or on protrusions of lens element 82 are merely illustrative. Other types of components (e.g., structural components such as support structure 26-3 in FIG. 6) may also be mounted in these locations.

Any of input-output components 94 in FIG. 7 may optionally send or receive signals (e.g., light) through lens module 72. For example, an input-output component may be an infrared light source (e.g., for a gaze tracking system) that emits a beam of light through lens elements 82, 84, and 86 towards eye box 60. An input-output component may be a camera (e.g., for a gaze tracking system) that captures images of the user's eye (e.g., at eye box 60) through lens elements 82, 84, and 86. An input-output component in FIG. 7 may be a front-facing camera (that captures images of the real world).

The example of lens element 82 (that is attached to display 14) having a protrusion and recess for mounting components is merely illustrative. Lens elements 84 and/or 86 may also optionally have protrusions or recesses for mounting components.

Figure 8:
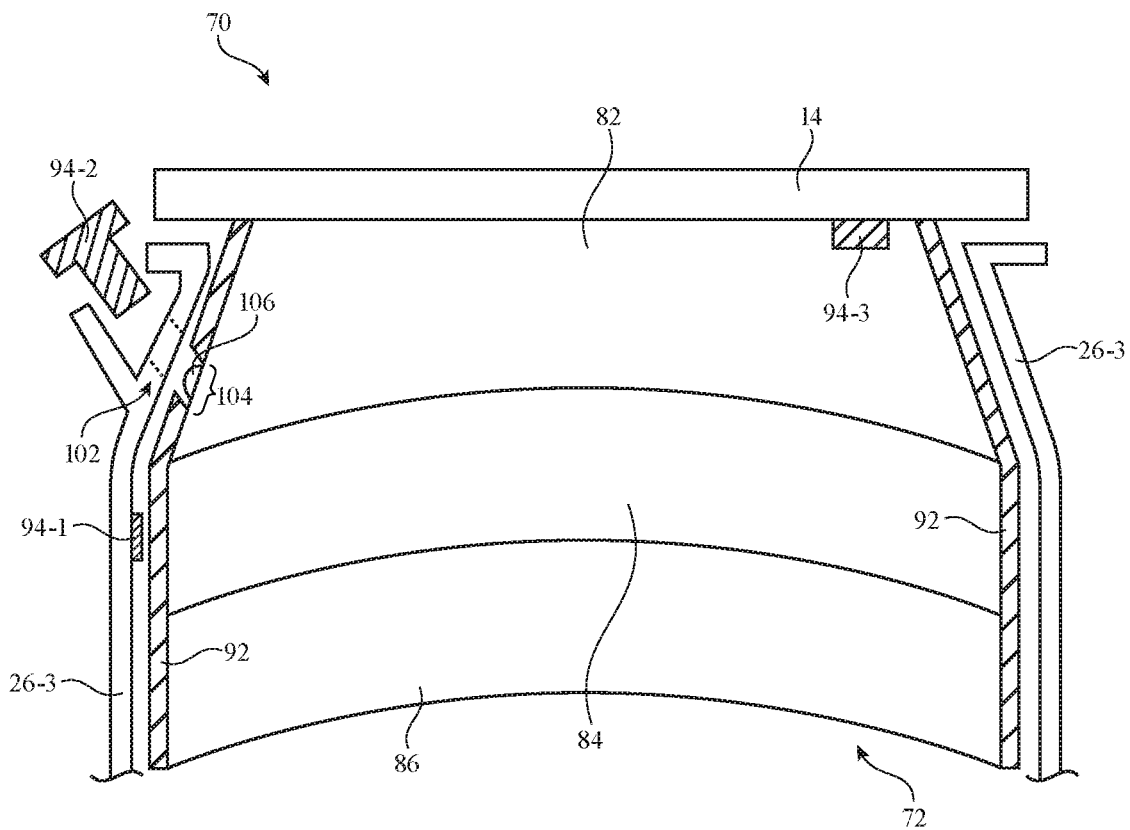
FIG. 8 is a cross-sectional side view of an illustrative display module with a display attached to a lens element and an input-output component that captures images through a support structure and the lens element in accordance with an embodiment.
Figure 8:
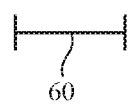

FIG. 8 is a top view of an illustrative display module with additional support structures showing how additional components may be incorporated into the display module. In FIG. 8, support structure 26-3 is shown. As described in connection with FIG. 5, support structure 26-3 may be a protective sheath around lens module 72, may provide structural support for display 14 and/or lens module 72, and/or may block light from escaping lens module 72. As shown in FIG. 8, input-output components 94 (e.g., input-output components 94-1, 94-2, 94-3) may be mounted on either side of support structure 26-3.

Input-output component 94-1, for example, is mounted on the interior surface of support structure 26-3 (e.g., on the lens module side of support structure 26-3). Input-output components may be positioned at other desired positions that are surrounded by support structure 26-3 (e.g., on protrusions or recesses of the lens elements of lens module 72). Input-output component 94-3 is positioned within support structure 26-3 and covered by lens element 82.

Input-output components may also be positioned on the exterior surface of support structure 26-3 (e.g., on the non-lens-module side of support structure 26-3). Input-output component 94-2, for example, is positioned on the side of support structure 26-3 opposite lens module 72. Components on this side of the support structure may still send or receive signals (e.g., light) through lens module 72. For example, input-output component 94-2 may be a camera (e.g., for a gaze tracking system) that captures images of the user's eye (e.g., at eye box 60) through lens elements 82, 84, and 86. To allow camera 94-2 in FIG. 8 to capture images of eye box 60, support structure 26-3 may have an opening 102 aligned with the camera. Similarly, light blocking coating 92 on the edge of lens module 72 may have an opening 104 aligned with opening 102 and camera 94-2. A camera lens element 106 may optionally be positioned between camera 94-2 and lens module 72. Camera lens element 106 may be mounted directly on the edge surface of lens element 82 as shown in FIG. 8, in one example. Camera lens element 106 may alternatively be supported by support structure 26-3 (e.g., in opening 102).

In the aforementioned examples, head-mounted device 10 is described as having two display modules, one for each eye. Each display module has a respective separately formed lens module. This allows the lens modules to move relative to each other (e.g., to account for interpupillary distance). However, for improved alignment, a single lens element may be used for both display modules. An example of this type is shown in FIG. 9.

Figure 9:
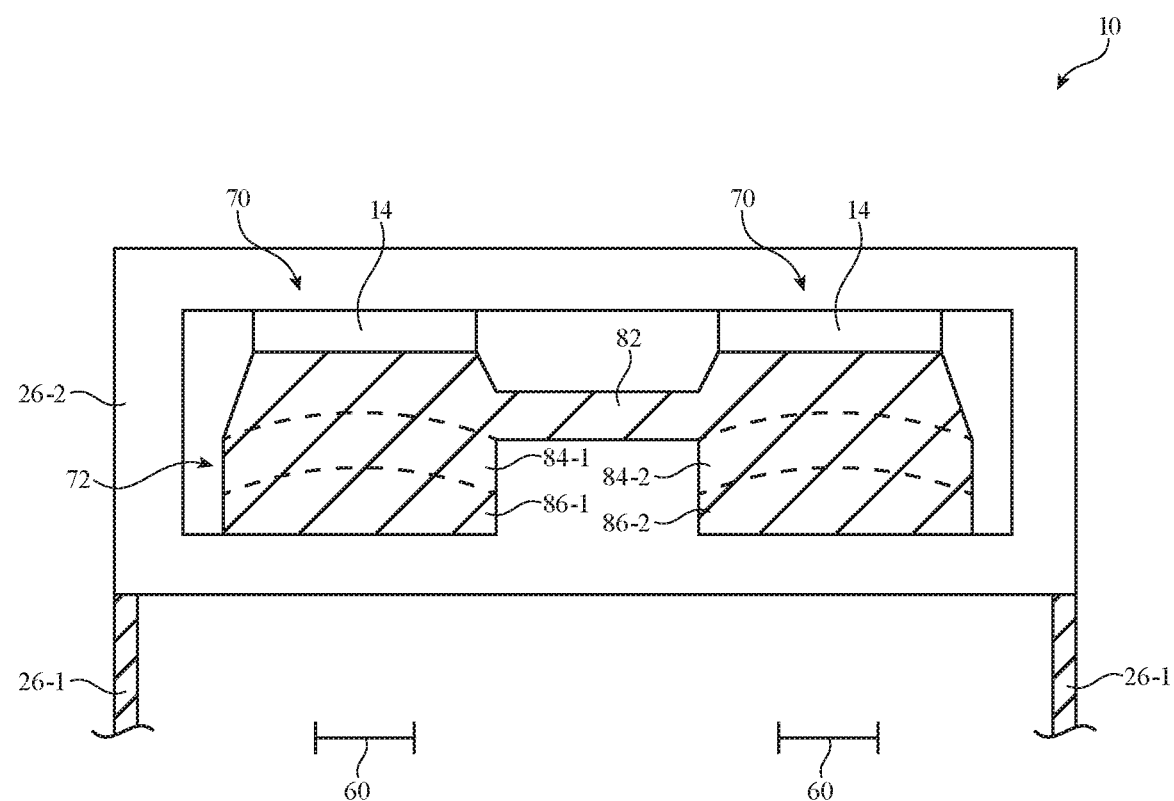
FIG. 9 is a top view of an illustrative head-mounted device with two display portions attached to a single lens element in accordance with an embodiment.

FIG. 9 is a top view of an illustrative head-mounted device having a single lens element that is shared between two display modules. As shown, each display module has a respective display portion 14. Both display portions are attached to a single lens element 82 that extends across the gap between the display portions. This type of arrangement fixes the distance between displays 14 (e.g., the device cannot adjust the distance between displays 14 to accommodate different interpupillary distances). However, attaching both display portions to a single lens element may improve alignment of the displays and lens elements within the device. If desired, a single display 14 may be used instead of first and second display portions 14. The single display may span the head-mounted device and provide images for both the left and right eye of the user. The single display may only be attached to a single lens element (e.g., lens element 82 is attached to the single display on both sides of the display).

In FIG. 9, each display module is depicted as having a respective second and third lens element. For example, lens element 82 is attached to lens elements 84-1 and 86-1 for the left display module and is attached to lens elements 84-2 and 86-2 for the right display module. This example is merely illustrative. If desired, lens elements 84-1 and 84-2 may be formed from a single unitary lens element that extends across both display modules (similar to lens element 82). Lens elements 86-1 and 86-2 may be formed from a single unitary lens element that extends across both display modules (similar to lens element 82). The number and shape of lens elements used may depend on the design constraints of the specific head-mounted device.

In FIGS. 3-9, embodiments have been described where a solid lens element (e.g., a rigid lens element formed from a glass or polymer material) is attached to the display such that no air gap is present between the lens module and the display. However, the air gap between a lens module and a display may instead be filled by a non-rigid lens element.

Figure 10:
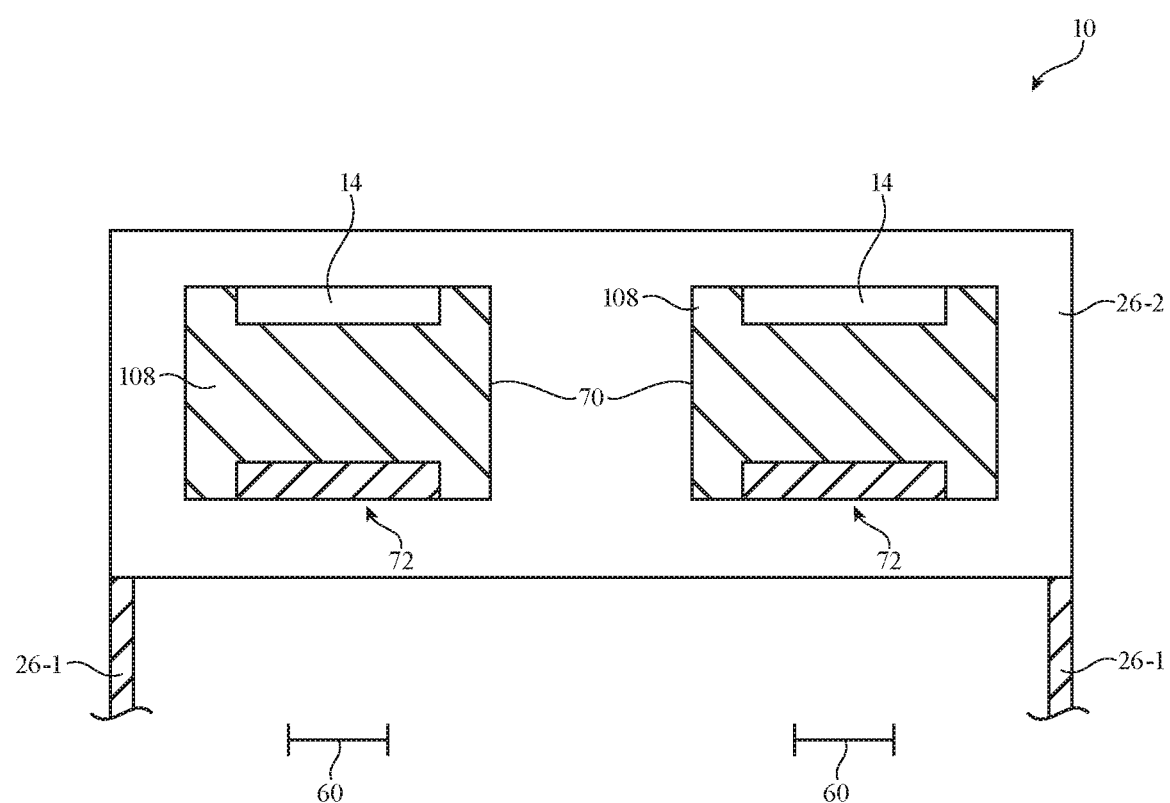
FIG. 10 is a top view of an illustrative head-mounted device with filler material between a display and a lens module in accordance with an embodiment.

FIG. 10 is a top view of an illustrative head-mounted device with a non-rigid lens element between the display and lens module. As shown, in FIG. 10, non-rigid lens element 108 (sometimes referred to as filler material 108 or gel 108) fills the space between display 14 and rigid lens elements of lens 72. The space between display 14 and rigid lens elements of lens 72 may be a cavity defined by support structures 26-2 (which may sometimes be referred to as lens module support structures). The filler material may be formed from a liquid or gel that conforms to surface variations of the edges of display 14 and lens module 72. In this way, gel 108 is coupled to the light-emitting surface of display 14. Although the gel lens element may not provide structural support for the rigid lens elements of lens 72 and display 14, the filler may still prevent dust or other contaminants from obscuring display 14. The non-rigid lens element 108 may be formed from any desired transparent material.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A system, comprising:
a head-mounted support structure;
a display having a display surface;
a lens element supported by the head-mounted support structure, wherein the lens element has a surface that faces and receives light from the display surface and wherein the surface of the lens element is optically and physically coupled to the display surface; and
an additional lens element aligned with and coupled to the lens element, wherein the additional lens element is a rigid lens element and is separated from the display surface by a gap and wherein the lens element fills the gap, wherein the lens element comprises a first material that has a first refractive index, wherein the additional lens element comprises a second material that has a second refractive index that is higher than the first refractive index, wherein the lens element has an additional surface that is interposed between the additional lens element and the surface of the lens element, and wherein the additional surface of the lens element provides refractive power to the system.

2. A system, comprising:
a head-mounted support structure;
a display having a display surface; and
a lens element supported by the head-mounted support structure, wherein the lens element has a surface that faces and receives light from the display surface, wherein the surface of the lens element is optically and physically coupled to the display surface, wherein the surface of the lens element is a first surface, wherein the lens element has a second surface that opposes the first surface and an edge between the first and second surfaces, wherein the lens element has a protrusion that extends from the edge, and wherein the system further comprises an input-output component mounted to the protrusion.

3. A system, comprising:
a head-mounted support structure;
a display having a display surface; and
a lens element supported by the head-mounted support structure, wherein the lens element has a surface that faces and receives light from the display surface, wherein the surface of the lens element is optically and physically coupled to the display surface, wherein the surface of the lens element is a first surface, wherein the lens element has a second surface that opposes the first surface and an edge between the first and second surfaces, wherein the lens element has a recess in the edge, and wherein the system further comprises an input-output component mounted in the recess.

4. A system, comprising:
a head-mounted support structure;
a display having a display surface;
a lens element supported by the head-mounted support structure, wherein the lens element has a surface that faces and receives light from the display surface, wherein the surface of the lens element is optically and physically coupled to the display surface, and wherein the head-mounted support structure comprises a lens module support structure that supports the lens element; and
a camera that is aligned with an opening in the lens module support structure, wherein the camera captures images through the opening and the lens element.

5. The system defined in claim 4, further comprising:
a camera lens element aligned with the opening and mounted on an edge of the lens element.

6. A system, comprising:
a head-mounted support structure;
a display having left and right display portions configured to display an image;
a first lens element that is coupled to both the left and right display portions, wherein the first lens element spans a gap between the left and right display portions, wherein the first lens element has a left portion that directs a portion of the image from the left display portion to a left eye box, wherein the first lens element has a right portion that directs a portion of the image from the right display portion to a right eye box, wherein the first lens element has first and second opposing surfaces, and wherein the first surface of the first lens element is coupled to the left and right display portions;
a second lens element that is attached to the second surface of the first lens element, wherein the second lens element is attached to the left portion of the first lens element; and
a third lens element that is attached to the second surface of the first lens element, wherein the third lens element is attached to the right portion of the first lens element.

7. The system defined in claim 6, further comprising:
a first layer of optically clear adhesive that overlaps the left display portion and couples the left display portion to the first lens element; and a second layer of optically clear adhesive that overlaps the right display portion and couples the right display portion to the first lens element.

\* \* \* \* \*